United States Patent [19]

Wester et al.

[11] Patent Number: 4,836,579
[45] Date of Patent: Jun. 6, 1989

[54] SUBSEA CASING HANGER SUSPENSION SYSTEM

[75] Inventors: Randy J. Wester, Spring; Bob C. Hopkins, Nassau Bay, both of Tex.; Donald M. Underwood, Rio de Janeiro, Brazil

[73] Assignee: FMC Corporation, Chicago, Ill.

[21] Appl. No.: 186,848

[22] Filed: Apr. 27, 1988

[51] Int. Cl.⁴ .................. E21B 33/00; E21B 33/04; E21B 33/047; F16L 39/00
[52] U.S. Cl. .................................... 285/3; 166/84; 166/86; 285/23; 285/141; 103/261
[58] Field of Search ............... 285/141, 140, 142, 143, 285/24, 23, 321; 166/38, 84, 86, 88, 77.5; 403/326, 261, DIG. 7

[56] References Cited

U.S. PATENT DOCUMENTS

| | | | |
|---|---|---|---|
| 3,773,360 | 11/1973 | Timbers | 285/321 X |
| 3,827,488 | 8/1974 | Piazza et al. | 285/142 X |
| 4,408,783 | 10/1983 | Gruller | 285/142 X |
| 4,528,738 | 7/1985 | Galle, Jr. | 285/141 X |
| 4,550,782 | 11/1985 | Lawson | 166/382 |
| 4,595,063 | 6/1986 | Jennings et al. | 285/141 X |
| 4,641,708 | 2/1987 | Wightman | 285/141 X |
| 4,691,780 | 9/1987 | Galle, Jr. et al. | 285/141 X |
| 4,696,493 | 9/1987 | Brammer | 285/313 X |

Primary Examiner—Randolph A. Reese
Assistant Examiner—Paul M. Frechette
Attorney, Agent, or Firm—W. William Ritt, Jr.; Richard B. Megley

[57] ABSTRACT

A well casing suspension system comprising a casing hanger assembly with an expandable, multiple shoulder, split load ring that is radially expanded into supporting position in a mating groove in a wellhead housing by contact with a previously installed annulus packoff.

3 Claims, 5 Drawing Sheets

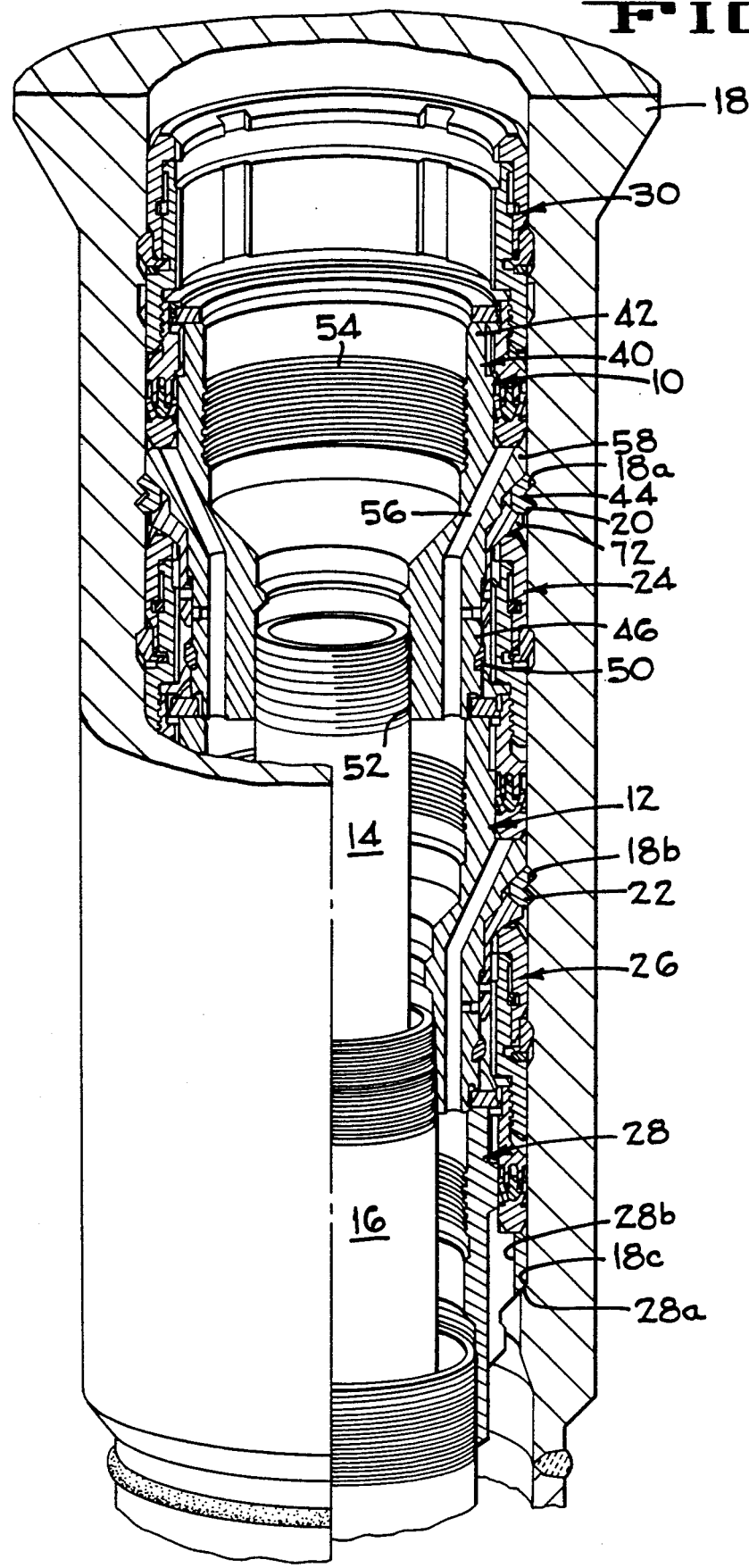
FIG_1

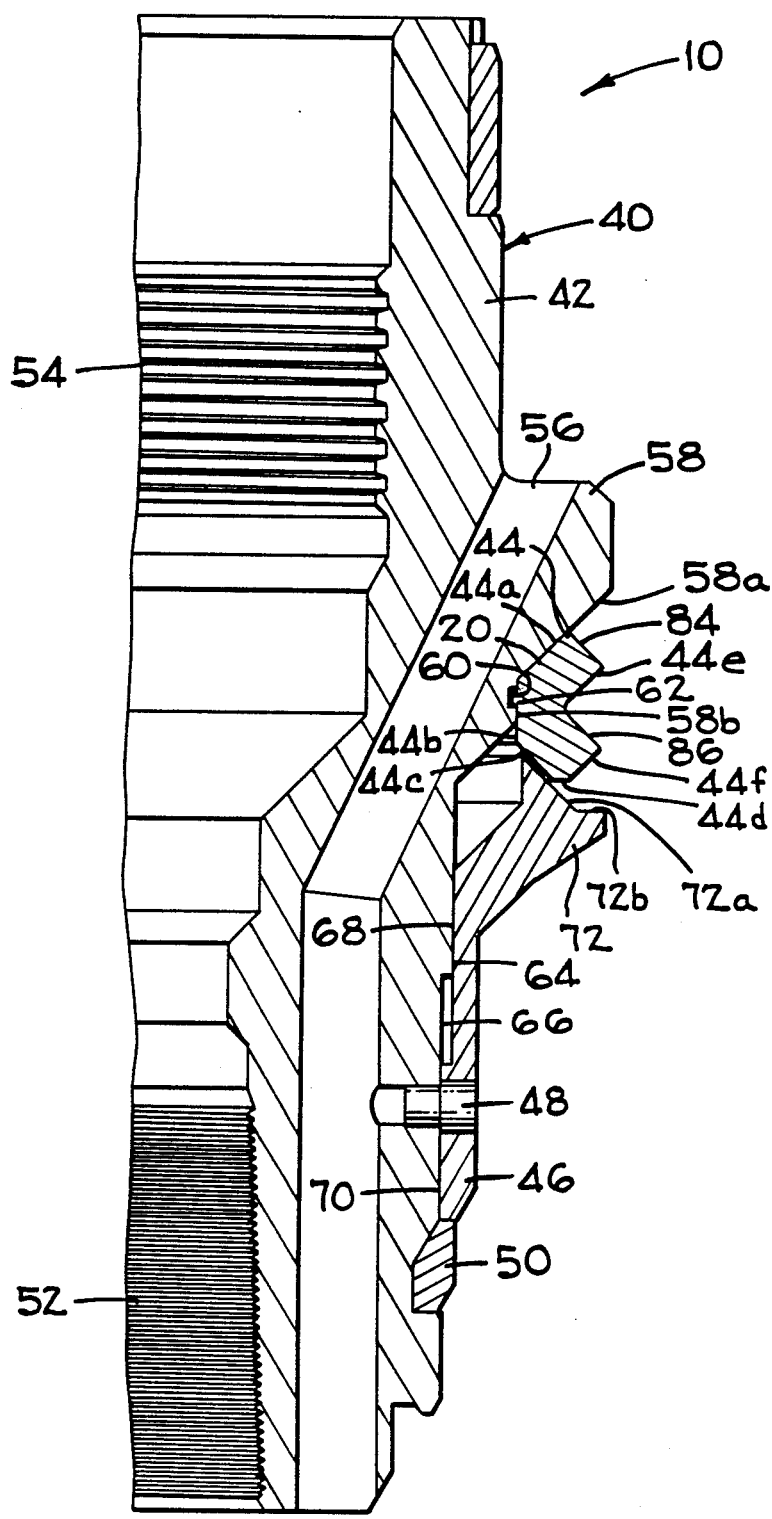

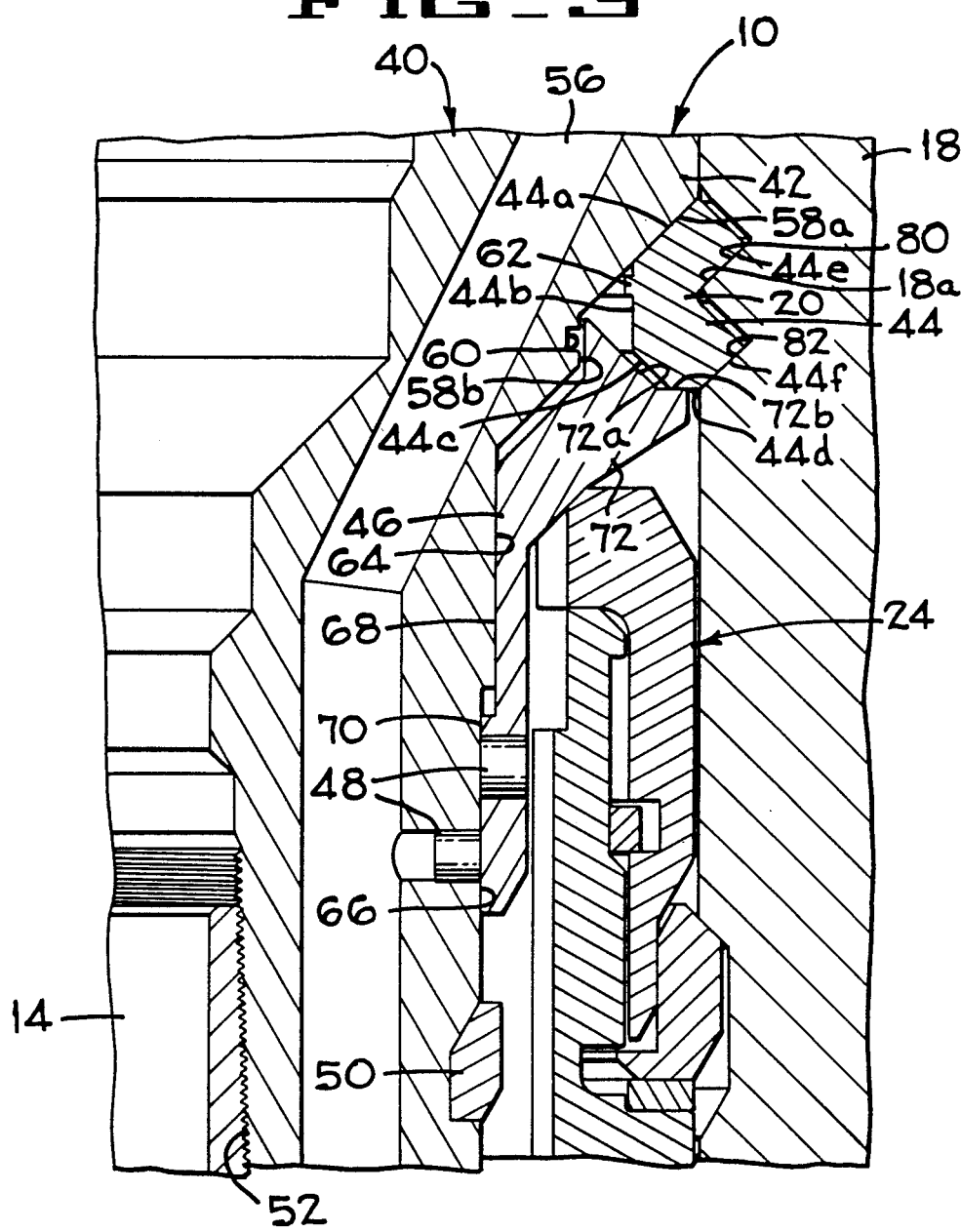

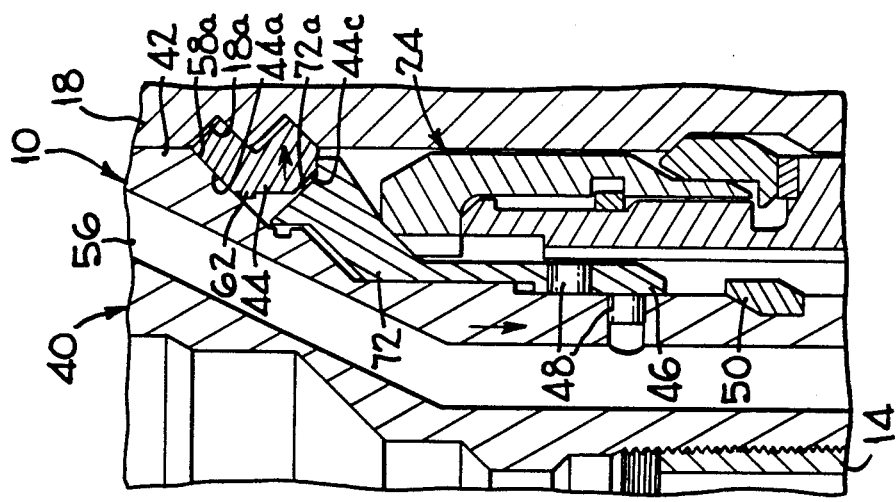
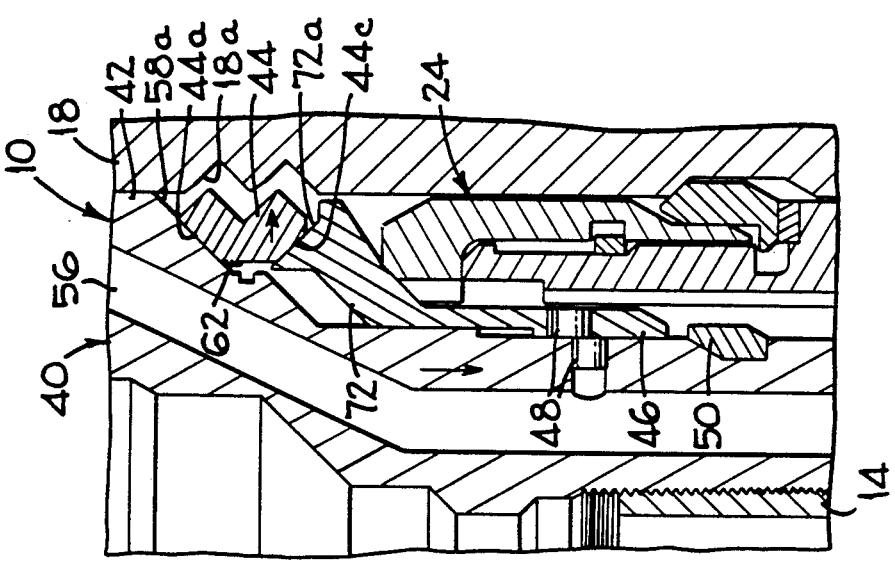
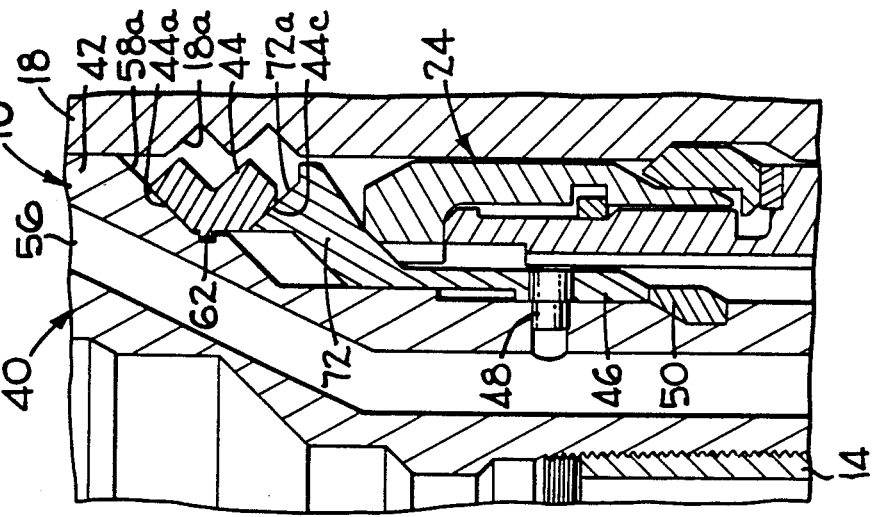

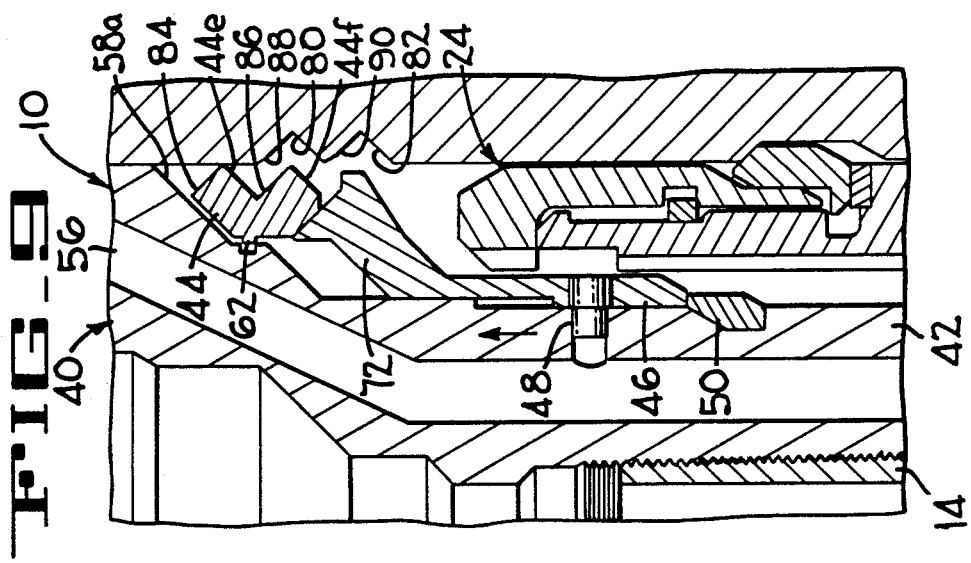
FIG_9
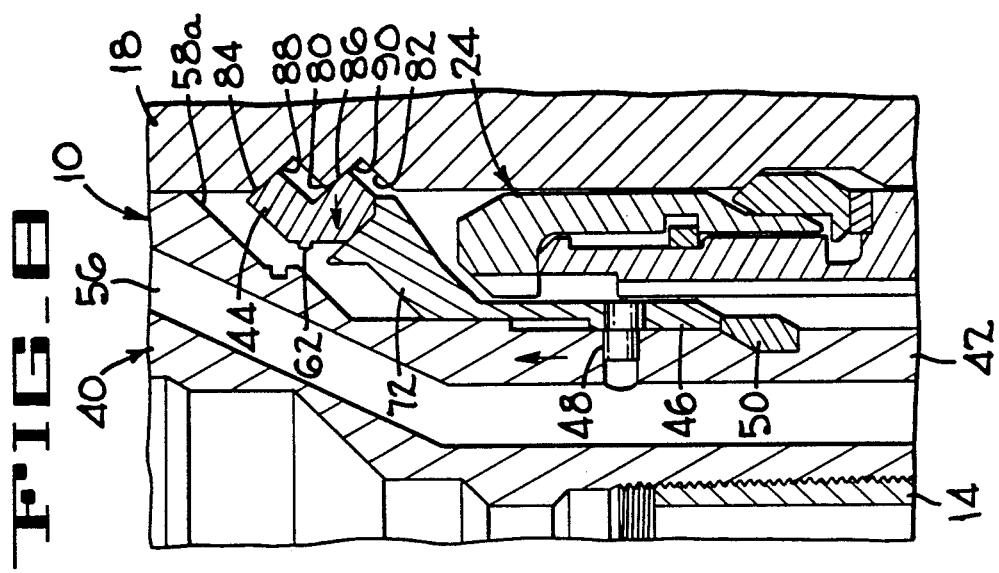
FIG_8
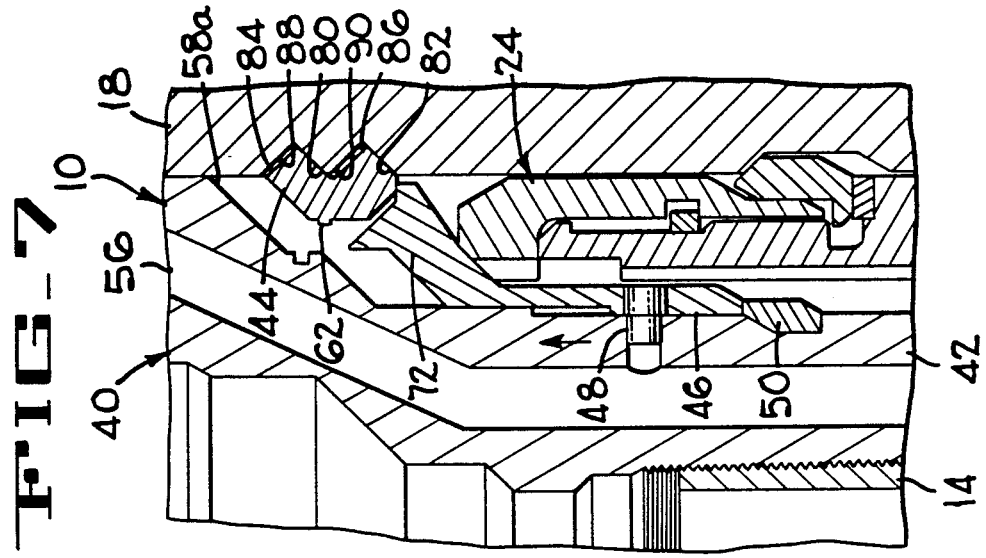
FIG_7

SUBSEA CASING HANGER SUSPENSION SYSTEM

This invention relates to well casing support systems, and more particularly to systems for suspending casing strings by hangers located in subsea wellheads.

BACKGROUND OF THE INVENTION

Most of the subsea well casing suspension systems currently employed in, or otherwise known to, the petroleum industry comprise a stacked downhole nesting of casing hangers, i.e., each progressively smaller hanger is stacked on, and thus supported by, the top of the previously installed hanger, whereby the total hang load of all the casing strings and their hangers plus the operating pressures in the well to which said strings and hangers are subjected is transferred to the wellhead at a single location near its base. There is a growing need in this industry for casing suspension systems capable of supporting hang loads and operating pressures considerably in excess of those for which the foregoing stacked systems were designed, and lately some higher performance designs have been proposed. However, most of these later designs result in placing all, or almost all, casing hang load and pressure load in a load path connection to a compressive load-carrying, hanger-bearing shoulder at the wellhead base. This stacked arrangement limits the hanger load carrying capability of the entire system, especially where it is exposed to a hydrogen sulfide environment which requires use of lower strength steels.

SUMMARY OF THE INVENTION

Broadly considered, the present invention involves an improved system for suspending well casing in a subsea wellhead, and more specifically a casing suspension system whereby each of a plurality of concentric casing strings and its hanger is directly and totally supported on the wellhead housing, independently of all the other strings and their hangers, by an expandable, split-ring type, multiple shoulder load ring that constitutes part of the hanger assembly and is installed in the wellhead housing as the hanger and the casing string are lowered into it. The load ring is radially expanded from its contracted condition surrounding the hanger by contact with a previously installed annulus packoff, rather than by contact directly with the wellhead housing itself, and this expansion extends the ring radially into a complementary annular groove in the housing.

The load ring has an angular cross-sectional configuration that precludes inadvertent activation of the ring by upward or downward loads imposed upon it when the casing string and its hanger assembly containing the ring are being lowered downhole during installation in the well. The geometry of the load ring is shaped to prevent its accidental radial engagement with the surrounding riser couplings and/or other elements through which the hanger assembly and its casing string descend during that installation, and in fact the load ring is locked in place on the hanger so that it will not expand radially as a result of being accidentally struck during such descent.

The load ring contains a plurality of shoulders which rest upon complementary shoulders in the annular groove in the wellhead housing for transmitting the load of the casing string and hanger assembly directly to the housing. The ring is retained on the hanger assembly such that when the hanger is properly installed and the ring is properly positioned on the shoulders in the housing groove, no hanger/casing load will be transferred to components other than the housing, such as a previously and properly installed packoff assembly, of the system. In the remote event of local partial failure (yielding) in the load ring/wellhead housing groove area, the load of the casing and its hanger assembly is partially transferred to the next lower hanger/load ring to prevent total failure of the casing and hanger system. Further, in the event the load ring is set improperly in the wellhead housing groove, the ring can be unseated from the groove and then reset without need for retrieval to and refurbishment at the rig floor, i.e., the system can be reset all while within the wellhead housing at the seafloor.

BRIEF DESCRIPTION OF DRAWINGS

FIG. 1 is an isometric view of a subsea wellhead housing and three concentric strings of well casing with the right half and upper portion of the left half of the housing in vertical central section to illustrate casing hanger and load ring assemblies of the present invention.

FIG. 2 is an enlarged fragmentary central vertical section of a hanger/load ring assembly of this invention, showing the elements in their relative positions prior to installation in a well.

FIG. 3 is a further enlarged fragmentary view of the assembly of FIG. 2 showing the relative position of the elements when properly installed in a surrounding wellhead housing.

FIGS. 4–9 are fragmentary sequential views of the hanger/load ring assembly of FIG. 2 during its installation in and subsequent retrieval from a subsea wellhead housing as illustrated in FIG. 1.

DESCRIPTION OF THE PREFERRED EMBODIMENT

As shown in FIG. 1, a subsea casing hanger suspension system according to the present invention comprises one or more casing hanger assemblies 10, 12 for supporting and transmitting the load of their concentric casing strings 14, 16, respectively, on and to a subsea wellhead housing 18 by means of expandable, split-ring type, multiple shoulder load rings 20, 22 that reside in complementary annular groove pairs 18a, 18b in the inner surface of the housing 18. Annular packoff assemblies 24, 26, which function primarily to seal the annulus between the wellhead housing 18 and their adjacent casing hangers 12 and 28, respectively, also provide a means to trigger the expansion of the load rings 20, 22 respectively, into their wellhead housing grooves 18a, 18b as the hanger assemblies 10, 12 approach their final position in the housing as shown in FIG. 1, as will be further explained later. The illustrated lowermost casing hanger 28 is of a conventional design with an annular shoulder 28a resting upon an annular support shoulder 18c on the inner surface of the housing 18, and with a plurality of circumferentially spaced axial flow passages 28b for conducting fluid during well-known installation and cementing procedures. Further, and for purposes of illustrating a more complete installation, an upper-most annular packoff assembly 30 is shown in functional position between the wellhead housing 18 and the upper/innermost hanger assembly 10. The packoff assemblies 24, 26, 30 are identical in this illustration, but it should be understood that their design may be varied so long as their functional cooperation with the adjacent casing hanger assemblies is not changed.

As seen better in FIG. 2, a casing hanger assembly 40 according to the present invention comprises a body 42, an expandable axially-split multiple shoulder load ring 44 inherently biased into a contracted condition surrounding the body 42, a load ring trigger sleeve 46 surrounding the body 42 below the load ring 44, a plurality of circumferentially spaced shear pins 48 (only one shown) releasably securing the sleeve 46 against axial movement with respect to the body 42, and an annular stop element 50 surrounding the body 42 for retaining the sleeve 46 on the body after the pins 48 have been sheared. The body 42 includes internal lower threads 52 for connecting it to an externally threaded end of a casing string or other pipe (not shown), internal upper threads 54 for attaching a running tool (not shown) to lower the hanger assembly into a wellhead housing, and a plurality of circumferentially spaced flow passages 56 for conducting fluids during installation and cementing of the hanger/casing string assembly.

The hanger body 42 has an upper annular external shoulder 58 with a first downwardly-facing frusto-conical surface 58a, a first cylindrical surface 58b extending axially from the lesser diameter end of the surface 58a, and an annular groove 60 in the surface 58b. The load ring 44 has a first inner frusto-conical surface 44a complementary to the body shoulder surface 58a, an inner cylindrical surface 44b extending axially from the lesser diameter end of the surface 44a, and an annular flange 62 extending inwardly from the surface 44b. As illustrated in FIG. 2, when the load ring 44 is in its contracted position its surfaces 44a, 44b are in contact with the body shoulder surfaces 58a, 58b, respectively, and the annular flange 62 extends into the annular groove 60. The flange 62 and the groove 60 cooperate to correctly locate the contracted load ring 44 on the hanger body, and also to retain the ring in that correct location until it is expanded during the setting procedure to be described later.

Below the shoulder 58 the hanger body has second and third outer cylindrical surfaces 64, 66 of different diameters and on which the trigger sleeve 46 with complementary inner surfaces 68, 70 is slidably located.

The trigger sleeve 46 has an upper portion 72 that extends upwardly and outwardly towards the load ring 44, terminating in a frusto-conical surface 72a and an adjoining annular radial surface 72b. The load ring 44 has a second inner frusto-conical surface 44c that is complementary to the sleeve surface 72a and that extends downwardly and outwardly from its cylindrical surface 44b to an annular radial surface 44d. The surfaces 44c and 72a cooperate in a camming manner to cause the load ring 44 to expand during the setting procedure, as will be explained later.

Referring now to FIG. 3, when the hanger assembly 40 has been run, landed and set in the wellhead housing 18 the load ring 44 has been forced from its contracted position (FIG. 2) into its functional load-bearing expanded position (FIG. 3) to support and transmit all the load of the hanger and its casing directly to the housing wall. The load ring has a first or upper outer frusto-conical load surface 44e that in its functional position is seated on a complementary first frusto-conical load shoulder 80 in the housing groove 18a, and a second or lower outer frusto-conical load surface 44f that in functional position is seated on a complementary second frusto-conical load shoulder 82 in that groove. Thus the hanger/casing load is transmitted through the surfaces 58a and 44a into the load ring 44, and thence from the load ring through its surfaces 44e, 44f directly to the housing 18 through its groove surfaces 80, 82, respectively, and none of that load is transmitted to either the adjacent packoff assembly 24 or any of the lower hangers.

INSTALLATION AND RETRIEVAL PROCEDURES

As illustrated in FIGS. 4-6, the hanger assembly 40 is installed in the wellhead housing 18 by lowering it into the housing, as by means of a conventional drill pipe or other running string, until the trigger sleeve 72 comes to rest on the previously installed packoff assembly (FIG. 4), and then relaxing the hold on the running string to permit the weight of the casing string to shear the pins 48 and move the hanger body 42 downward with respect to the trigger sleeve (FIG. 5), which movement also causes the load ring 44 to be cammed radially towards the housing groove 18. This downward movement terminates when the load ring 44 comes to rest against the load shoulders 80, 82 of the housing groove (FIG. 6), the final, set position of the hanger in the housing.

FIGS. 7-9 illustrate the sequential movement of the hanger assembly components during either recocking of the load ring 44 for re-installation in the wellhead housing or retrieval of the hanger/casing string from the well. As the hanger body 42 is lifted, as by means of a running string (not shown) extending from the hanger to the surface platform, the annular stop element 50 rises into contact with the lower end of the trigger sleeve 46 (FIG. 7), and further lifting (FIG. 8) causes the sleeve to move upwardly with the body and the load ring 44 to be lifted in the housing groove 18. The ring has outer frusto-conical surfaces 84, 86 that contact complementary frusto-conical groove surfaces 88, 90, respectively during upward movement of the ring, whereby further movement upwardly causes the ring to be cammed inwardly out of the groove (FIG. 8) until it contracts into the position shown in FIG. 9 wherein it can either continue upward through the housing 18 for retrieval, or be lowered with the other elements of the hanger assembly to reset it as per the sequence of FIGS. 4-6.

We claim:
1. A well casing suspension system for supporting a plurality of concentric casing strings in a wellhead, comprising:
   (a) an annular wellhead housing having at least one annular groove in its inner surface, said groove including a pair of annular frusto-conical upwardly and inwardly facing support surfaces and at least one annular frusto-conical downwardly and inwardly facing cam surface;
   (b) a casing hanger assembly comprising:
      (1) a tubular body having means for attaching a well casing string, means for attaching a hanger running tool, an upper annular external shoulder with a first downwardly-facing frusto-conical surface, a first cylindrical surface extending axially downward from said first frusto-conical surface, an annular groove in said first cylindrical surface intermediate its ends, and stop means on the outer surface of said tubular body below said first cylindrical surface;

(2) an expandable, split, multi-shouldered load ring surrounding said tubular body beneath said external shoulder, said load ring having a first inner frusto-conical surface complementary to said first frusto-conical surface of said tubular body, an inner cylindrical surface extending axially downwardly from said first inner frusto-conical surface, an annular flange extending inwardly from said inner cylindrical surface, a second inner frusto-conical surface extending downwardly and outwardly from said inner cylindrical surface, an annular radial surface extending outwardly from said second inner frusto-conical surface, a first frusto-conical load supporting surface extending upwardly and outwardly from said annular radial surface, and a first frusto-conical load ring camming surface extending upwardly and inwardly from said first load supporting surface;

(3) sleeve-like trigger means surrounding and axially slidable on said tubular body between said load ring and said stop mean, said trigger means including a frusto-conical surface complementary to said second inner frusto-conical surface of said load ring, and an annular radial surface in opposed position with respect to said load ring radial surface; and (c) an annular packoff assembly positioned within the wellhead housing, said packoff assembly comprising a stop shoulder upon which said trigger means comes to rest as said casing hanger assembly is lowered into said wellhead housing, said packoff stop shoulder functioning to prevent further downward movement of said trigger means.

2. A well casing suspension system according to claim 1 wherein said annular groove in said first cylindrical surface of said tubular body cooperates with said load ring annular flange to prevent accidental dislodgement of said load ring from a contracted position about said body.

3. A well casing suspension system according claim 1 wherein said load ring is recockable into a contracted position about said tubular body for reloading and resetting said casing hanger assembly without need to withdraw said hanger assembly from said wellhead housing.

* * * * *